United States Patent
Futschik et al.

(10) Patent No.: US 6,942,370 B2
(45) Date of Patent: Sep. 13, 2005

(54) MOTOR VEHICLE LAMP UNIT AND METHOD OF MAKING THE LAMP UNIT

(75) Inventors: Hans-Dieter Futschik, Gechingen (DE); Norbert Weber, Bondorf (DE); Walter Nuber, Goeppingen (DE)

(73) Assignee: DaimlerChrysler AG, Stuttgart (DE)

( * ) Notice: Subject to any disclaimer, the term of this patent is extended or adjusted under 35 U.S.C. 154(b) by 23 days.

(21) Appl. No.: 10/135,831

(22) Filed: May 1, 2002

(65) Prior Publication Data

US 2002/0181245 A1 Dec. 5, 2002

(30) Foreign Application Priority Data

May 2, 2001 (DE) .......................................... 101 21 387

(51) Int. Cl.[7] ................................................. F21V 9/08
(52) U.S. Cl. ...................... 362/540; 362/538; 362/806; 40/556
(58) Field of Search ................................ 362/507, 539, 362/806, 540, 538, 544, 520, 521, 23–25, 28, 29; 40/556, 541–583

(56) References Cited

U.S. PATENT DOCUMENTS

| | | | | |
|---|---|---|---|---|
| 1,787,443 A | * | 1/1931 | Falge | 362/521 |
| 1,864,706 A | * | 6/1932 | Albright | 40/573 |
| 1,871,648 A | * | 8/1932 | Baker | 40/556 |
| 1,962,838 A | * | 6/1934 | Regester | 40/564 |
| 2,220,820 A | * | 11/1940 | Knudsen | 362/540 |
| 4,727,458 A | * | 2/1988 | Droste et al. | 362/539 |
| 4,791,402 A | * | 12/1988 | Vaughn | 340/468 |
| 5,021,930 A | * | 6/1991 | Yamada | 362/539 |
| 5,172,972 A | * | 12/1992 | Terao | 362/517 |
| 5,353,204 A | * | 10/1994 | Kawamura | 362/538 |
| 5,652,565 A | * | 7/1997 | Salcedas et al. | 340/479 |
| 5,931,566 A | * | 8/1999 | Fraizer | 362/293 |
| 6,428,194 B1 | * | 8/2002 | Oschmann et al. | 362/507 |

FOREIGN PATENT DOCUMENTS

| | | |
|---|---|---|
| DE | 4336547 | 10/1994 |
| DE | 29912504 | 10/1999 |
| EP | 0791911 A2 | 8/1997 |
| EP | 0791911 A3 | 1/1999 |
| GB | 2024486 A | 1/1980 |
| JP | 4078629 A | 3/1992 |
| JP | 07002017 A | 1/1995 |

* cited by examiner

*Primary Examiner*—Stephen Huser
*Assistant Examiner*—Hargobind S. Sawhney
(74) *Attorney, Agent, or Firm*—Crowell & Moring LLP

(57) ABSTRACT

A lamp unit for a motor vehicle includes a light source, a substantially plano-convex projection lens, and an identification symbol. The projection lens has the configuration of a spherical segment and a central region, and the identification symbol is disposed in the central region of the planar side of the projection lens. The planar side of the lens faces the light source. A method of making a lamp unit for a motor vehicle includes disposing an identification symbol in a central region of a planar side of a substantially plano-convex projection lens of the lamp unit, wherein the planar side of the lens faces a light source.

17 Claims, 2 Drawing Sheets

MOTOR VEHICLE LAMP UNIT AND METHOD OF MAKING THE LAMP UNIT

This application claims the priority of German Patent Document No. 101 21 387.5, filed May 2, 2001, the disclosure of which is expressly incorporated by reference herein.

BACKGROUND AND SUMMARY OF THE INVENTION

The invention relates to a lamp unit for motor vehicles and a method of making the lamp unit.

EP 0791 911 A2 discloses a lamp unit that has a light source, a reflector, and a plano-convex lens whose planar side faces the light source. An emblem is introduced as identification symbol on the planar side.

The emblem is easily visible to a viewer only when the viewer is situated at least approximately centrally in front of the lamp unit. When the viewer views the lamp unit at an oblique angle, the emblem becomes distorted or unclear.

It is therefore an object of the invention to create a lamp unit whose identification symbol is clearly visible over a substantially larger viewing angle.

This object is achieved by means of a lamp unit described hereinafter.

In accordance with the invention, a lamp unit is shaped as a projection headlamp and has a projection lens that is constructed in the shape of a spherical segment such that an identification symbol arranged on its planar side can be seen without distortion and clearly over a relatively large viewing angle. The arrangement of the identification symbol on the planar side permits the identification symbol to be applied in a way that is relatively simple and free from distortion. The identification symbol may be applied by means of, for example, a sand-blasting method. In order for the viewer to have an equally good view of the identification symbol over a large angular range, it is preferable to arrange the symbol in a central region of the planar side. In addition, an identification symbol, centrally arranged in a suitably small region, does not appreciably impair the light passing through the lens. It is clear that the lens in the shape of a spherical segment has substantial thickness and curvature, and the identification symbol can be seen without distortion even at an oblique viewing angle.

In this case, the projection lens can be arranged in an area behind a transparent cover plate that is adapted, for example, to the front end of a motor vehicle.

If the light exit aperture of the lens is surrounded by a circumferential trim ring which has a reflecting surface opposite the convex side of the lens, the reflected daylight falling into the projection lens reproduces the identification symbol particularly effectively. In this case, the reflecting surface of the trim ring can be colored so as to reflect in a silver-frosted fashion or in some other way, such that the identification symbol is reproduced with a color component of the color of the reflecting surface.

In a preferred embodiment, if the diameter of the central region is approximately ¼ to ⅓ of the lens diameter, the identification symbol may not appreciably impair the light passing through the projection lens.

Other objects, advantages and novel features of the present invention will become apparent from the following detailed description of the invention when considered in conjunction with the accompanying drawings.

DETAILED DESCRIPTION OF THE DRAWINGS

Figure 1:
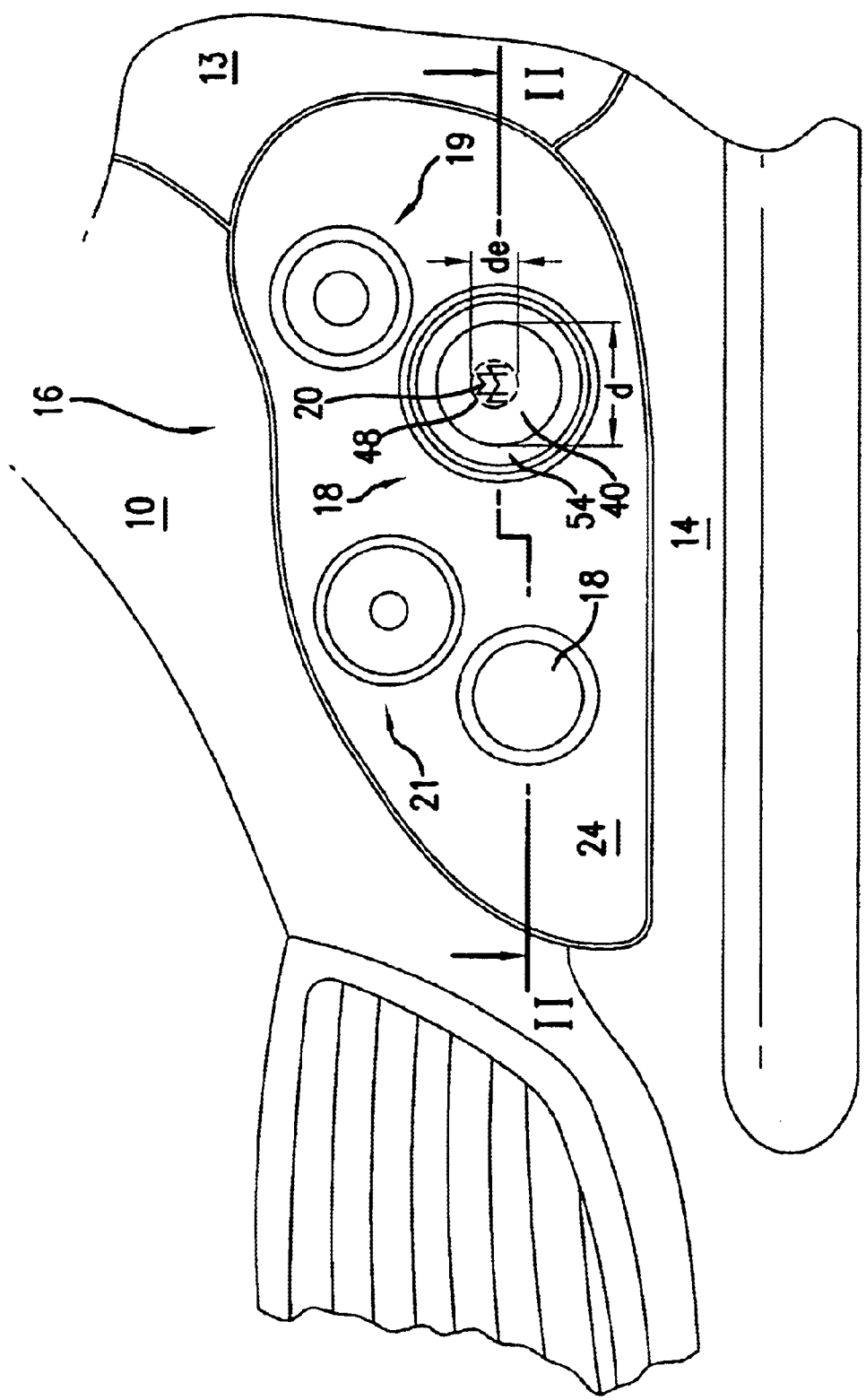
FIG. 1 shows a partial diagrammatic front view of the front end of a motor vehicle with a left front lamp unit in which two projection modules are arranged at the bottom.

Illustrated in FIG. 1 in a partial diagrammatic front view is the front end of a motor vehicle which includes an engine bonnet 10, a radiator grille 12, a wing 13, a bumper unit 14 and a lamp unit 16 as a projection headlamp. The lamp unit 16 comprises at the bottom two projection modules 18, which are described in more detail below. The right lower projection module 18 (as seen from the front) has an identification symbol 20 in the form of a mark. A flasher module 19 and a reflection module 21 are also integrated in the lamp unit 16.

Figure 2:
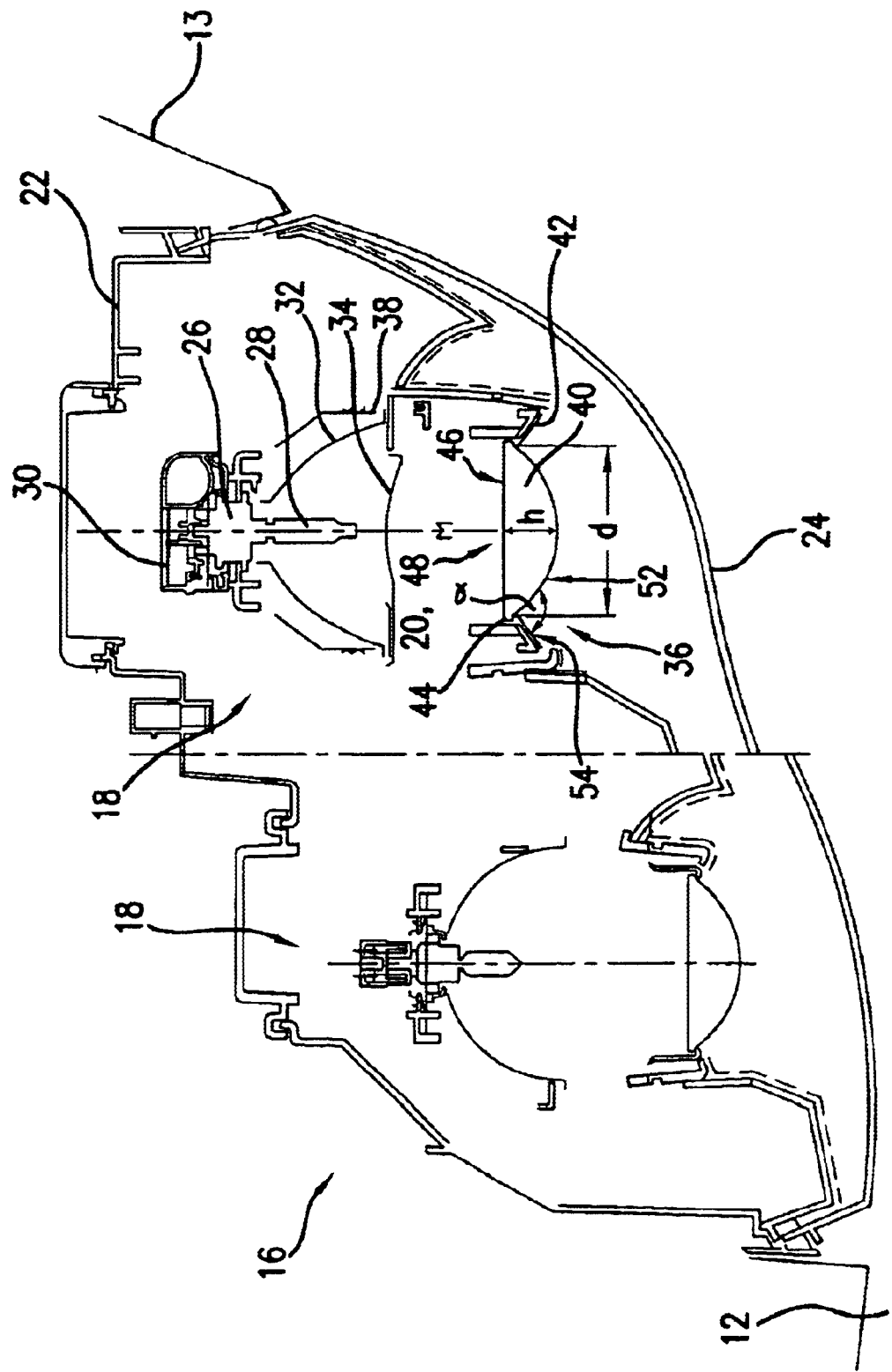
FIG. 2 shows a section along the line II—II, as shown in FIG. 1, through the lamp unit and the two projection modules.

FIG. 2 illustrates a section along the line II—II in FIG. 1 through the lamp unit and through the two projection modules 18. The lamp unit comprises a plastic housing 22, inside which the two projection modules 18 are arranged. The housing 22 is sealed at the front by a transparent cover plate 24, which is made from glass or plastic. As shown in FIG. 1, the transparent cover plate 24 is adapted to the front end of the motor vehicle in the connecting region between the cover plate 24 and wing 13 and between the cover plate 24 and engine bonnet 10. The projection modules 18 are therefore arranged recessed inside the housing 22 relative to the front end of the vehicle. As shown in FIG. 1, one of the projection modules 18 has a mark 20. Each of the projection modules 18 has a light source 28 supported by a lamp holder 26 which holds the light source. The lamp holder 26 itself is accommodated in a support housing 30. The xenon light source 28 is surrounded by an ellipsoid reflector 32 at whose front end a cover plate 34 partially covering the beam path is provided. The lens optic 36 is arranged in the beam path of the light source 28 in an area in front of the reflector 32. Overall, the structural unit, including the reflector 32 and the light source 28 as well as the lens optic 36, is supported by a supporting frame 38 of the projection module 18, which supporting frame is only partially shown in FIG. 2. The lens optic 36 comprises a substantially plano-convex projection lens 20 and a trim ring 42. The projection lens 20 is substantially in the shape of a spherical segment with an annularly circumferential shoulder 44. The lens 20 is supported at its shoulder 44 by, and fastened on, the supporting frame 38. In this embodiment, the projection lens 20 has a diameter d of approximately 70 mm and a height h of approximately 24 mm. Lenses having a ratio of diameter d to height h of approximately 2:1 to 4:1 have proved to be particularly advantageous. The virtual center M of the sphere of the spherical segment lies inside the projection module 18 between the lens optic 36 and the reflector.

As shown in FIG. 1 with dashes, the identification symbol 50 is in a central region 48 of the planar side 46, which faces the light source 28, of the projection lens 20, and is applied to the surface of the lens by means of, for example, sand-blasting. Of course, other methods which change the surface roughness can be used to make the identification symbol 50. The identification symbol 50 can also be glued to the surface, painted on the surface, or applied to the surface in any suitable manner. Since the identification symbol 50 is arranged on the planar side 46, it can be applied to the surface in a simple way free from distortion. The positioning of the identification symbol in the central region 48 ensures that the identification symbol does not appreciably impair the light passing through the lens. In the exemplary embodiment shown, the identification symbol 50 is of mirror-symmetric shape, and the diameter de (see FIG. 1) of the central region 48 is approximately 20 mm and preferably approximately ¼ to ⅓ of the lens diameter d.

The light exit aperture of the projection lens 20 is surrounded by the trim ring 42. The trim ring 42 has a reflecting surface 54 opposite the convex side 52 of the projection lens 20. In order to reflect daylight with the light source 28 switched off, the reflecting surface 54 is colored in a silver-frosted fashion. In this case, the reflecting surface 54 is arranged radially outwards at an angle α of approximately 80 to 100° relative to the convex side 52 of the lens 20. A portion of the daylight reflected into the lens 20 by the reflecting surface 54 strikes the identification symbol and causes the symbol to appear in the same color as the reflecting surface 54, i.e., the silver-frosted color of the reflecting surface 54. In other words, the reflecting surface 54 can be colored in a desired manner, preferably a relatively bright color, which is then reproduced in the identification symbol 50. In addition, the reflecting surface 54 has the further function of somewhat increasing the light exit through the projection lens 20 with the light source 28 switched on.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lamp unit for motor vehicles, comprising:
   a projection headlamp including:
   a reflector;
   a light source assigned to the reflector; and
   a substantially plano-convex projection lens having a planar side that faces the light source and is provided with an identification symbol, wherein:
   the projection lens is in the shape of a spherical segment; and
   the identification symbol is arranged exclusively in a central region of the planar side of the projection lens.

2. The lamp unit according to claim 1, wherein the projection lens is arranged behind a transparent cover plate.

3. The lamp unit according to claim 1, wherein the light exit aperture of the projection lens is surrounded by a circumferential trim ring.

4. The lamp unit according to claim 3, wherein the trim ring has a reflecting surface opposite the convex side of the projection lens.

5. The lamp unit according to claim 4, wherein the reflecting surface of the trim ring is arranged directed radially outwards from the convex side of the projection lens.

6. The lamp unit according to claim 4, wherein the reflecting surface of the trim ring reflects in a silver-frosted fashion.

7. The lamp unit according to claim 1, wherein the diameter of the central region is approximately ¼ to ⅓ of the lens diameter.

8. The lamp unit according to claim 1, wherein the lamp unit comprises a plurality of projection modules, only the projection lens of one of the projection modules being provided with the identification symbol.

9. The lamp unit according to claim 1, wherein the identification symbol is one of a mark and an emblem.

10. The lamp unit according to claim 1, wherein the identification symbol is of mirror-symmetric shape.

11. A lamp unit for a motor vehicle, comprising:
    a light source;
    a substantially plano-convex projection lens having the configuration of a spherical segment, the projection lens having a planar side that faces the light source and has a central region; and
    an identification symbol disposed in the central region of the planar side of the projection lens.

12. The lamp unit according to claim 11, further comprising:
    a trim ring, and wherein the projection lens is surrounded by the trim ring.

13. The lamp unit according to claim 12, wherein the trim ring has a reflecting surface, and the reflecting surface is positioned radially outward from the convex side of the projection lens.

14. The lamp unit according to claim 13, wherein the reflecting surface of the trim ring reflects in a silver-frosted fashion.

15. The lamp unit according to claim 11, wherein each of the lens and the central region is circular, and the diameter of the central region is approximately ¼ to ⅓ of the lens diameter.

16. A method of making a lamp unit for a motor vehicle, comprising:
    disposing an identification symbol in a central region of a planar side of a substantially plano-convex projection lens of the lamp unit, wherein the planar side of the lens faces a light source of the lamp unit;
    disposing a trim ring around the projection lens; and
    positioning a reflecting surface of the trim ring radially outwards from the convex side of the projection lens.

17. A method of making a lamp unit for a motor vehicle, comprising:
    disposing an identification symbol in a central region of a planar side of a substantially plano-convex projection lens of the lamp unit, wherein the planar side of the lens faces a light source of the lamp unit; and
    disposing a trim ring around the projection lens, wherein the reflecting surface of the trim ring reflects in a silver-frosted fashion.

* * * * *